United States Patent

[11] 3,565,216

[72] Inventor Theodore E. Gohlke
13301 Kilbourne, Detroit, Mich. 48213
[21] Appl. No. 768,700
[22] Filed Oct. 18, 1968
[45] Patented Feb. 23, 1971

[54] CABLE-PROPELLED VEHICLE-INCLINED TRACK SYSTEM
14 Claims, 8 Drawing Figs.
[52] U.S. Cl.................................................... 187/12,
187/14, 187/35, 187/95, 187/27, 104/178
[51] Int. Cl....................................................... B66b 7/02,
B66b 5/12
[50] Field of Search............................................ 16/86.1,
86.2, 87, 91; 104/93, 178; 105/150, 178; 187/10,
12, 14, 13, 35, 43, 44, 94, 23

[56] References Cited
UNITED STATES PATENTS
982,809 1/1911 Grable......................... 187/35
2,950,948 8/1960 Hardigan et al............... 187/12
3,014,556 12/1961 Stelzer......................... 187/12
3,435,578 4/1969 Klein........................... 104/172
FOREIGN PATENTS
805,274 12/1958 Great Britain................ 187/44

Primary Examiner—Arthur L. La Point
Assistant Examiner—Robert W. Saifer
Attorney—Whittemore, Hulbert and Belknap ABSTRACT: The system comprises an inclined track mounted on a hill or other inclined surface. A carriage is movable on the track. Power means are provided for moving the carriage up and down the incline. Brake means are provided on the carriage to automatically lock the carriage to the track in the event of failure of the power means. Control switch means are provided to automatically stop the carriage at the end of its run. The control switch means may be selectively operated by a passenger in the carriage. Safety switch means are provided to stop the carriage at the end of the incline in the event of a failure of the control switch means. The carriage is mounted on the track so as to be always in an upright position whereby the passenger does not have to assume an inclined posture.

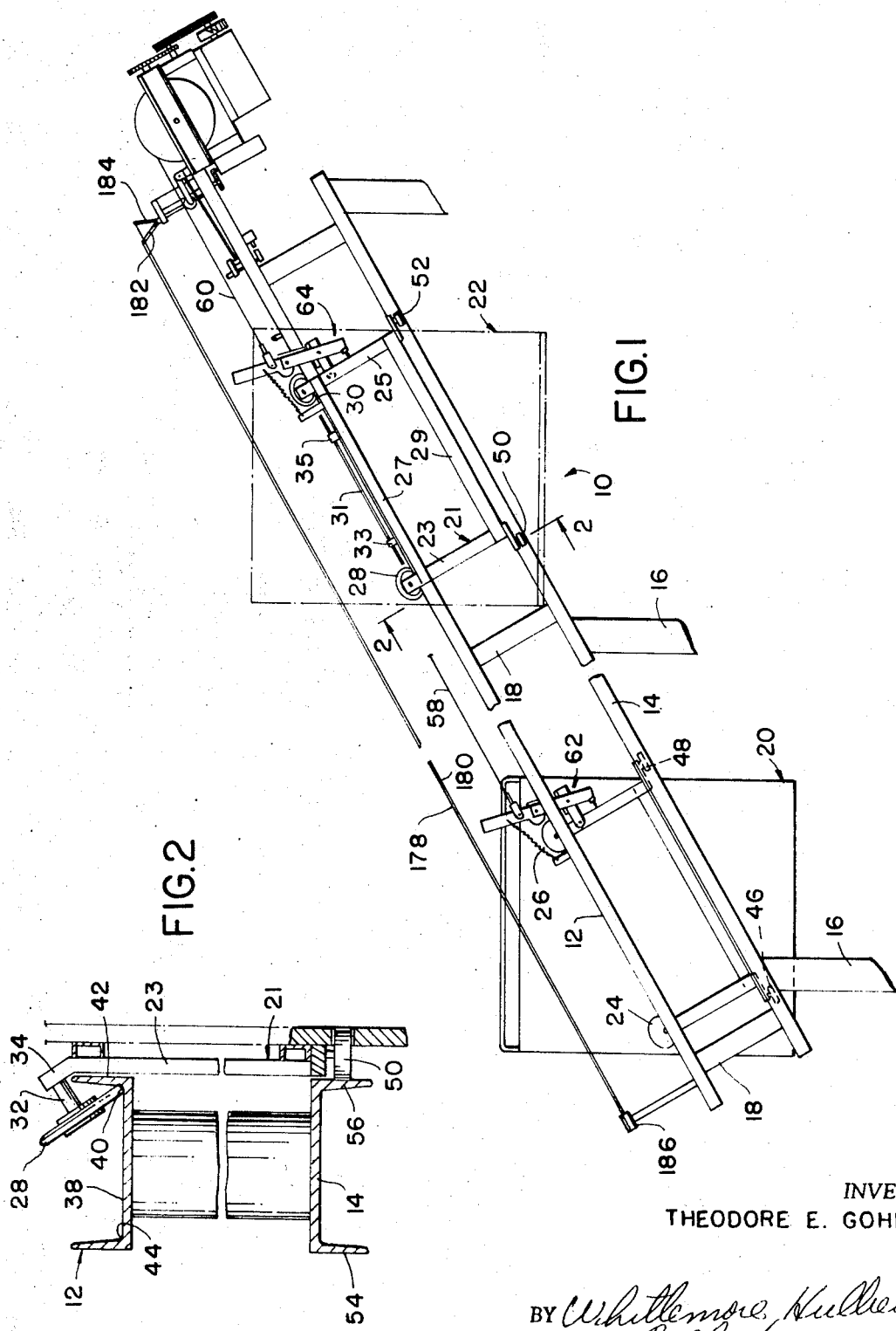

INVENTOR
THEODORE E. GOHLKE

BY Whittemore, Hulbert
& Belknap
ATTORNEYS

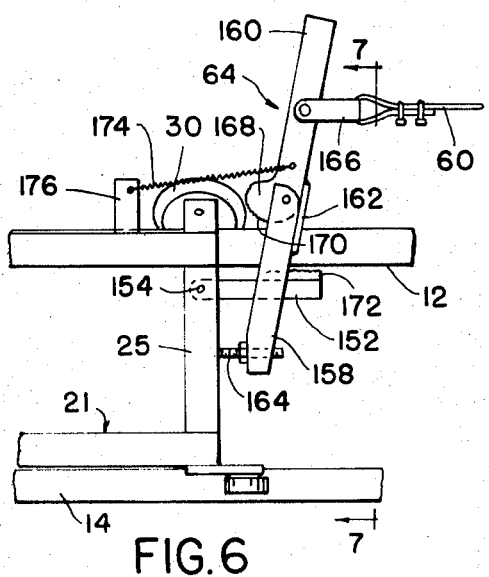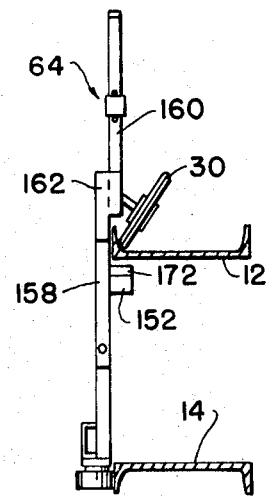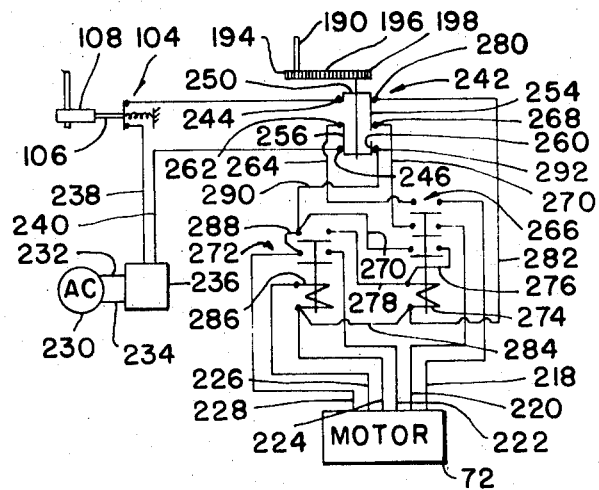

CABLE-PROPELLED VEHICLE-INCLINED TRACK SYSTEM

BACKGROUND OF THE INVENTION

There are many instances where it is desirable to have a lift for transporting people up and down inclined surface. For example, many cottages and summer homes are built around lakes at the top of an incline which leads down to the lake. Walking up and down the incline is laborious and may be injurious to people suffering physical infirmities such as heart ailments and the like.

Many lift devices have been proposed in the past. However, previously proposed lift devices have been relatively expensive and have not provided adequate safety and control means for the passengers. The present invention provides a lift device which incorporates control means which are always operable by a passenger to start, stop or reverse direction of the lift. Further, control means are provided to automatically stop the lift at the end of a run. Safety means are provided as a second stop device in the event of failure of the automatic stopping means. A brake is provided which is automatically actuated in the event the lift power transmission means fails with the result that the lift cannot run away. The overall structure is fail-safe, convenient to operate and relatively inexpensive to manufacture.

SUMMARY OF THE INVENTION

The lift comprises an inclined track having at least one carriage movable thereon. Power means are provided for moving the carriage up and down the incline. Power transmission means are connected between the carriage and the power means. Brake means are provided on the carriage to selectively lock the carriage to the track. Brake actuating means are provided. The brake actuating means are operable to cause application of the brake means upon failure of the power means or power transmission means. Means are also provided to signal the brake actuating means upon such failure. Control line means are provided. The control line means are accessible to a passenger in the carriage and run substantially the length of the track. The control line means operate a control switch means which starts, stops and reverses direction of drive of the power means. In the Drawings:

FIG. 1 is a side elevational view of one embodiment of the cable-propelled vehicle-inclined track system of the present invention;

FIG. 2 is a sectional view taken substantially along the line 2-2 of FIG. 1 looking in the direction of the arrows;

FIG. 6 is an enlarged view of the brake structure provided on the carriage adjacent to the upper end of the mechanism illustrated in FIG. 1;

FIG. 7 is a view in section taken substantially along the line 7-7 of FIG. 6 looking in the direction of the arrows; and FIG. 8 is an electrical schematic view of the control system for the driving motor of the system.

DESCRIPTION OF THE PREFERRED EMBODIMENT

Figure 3:
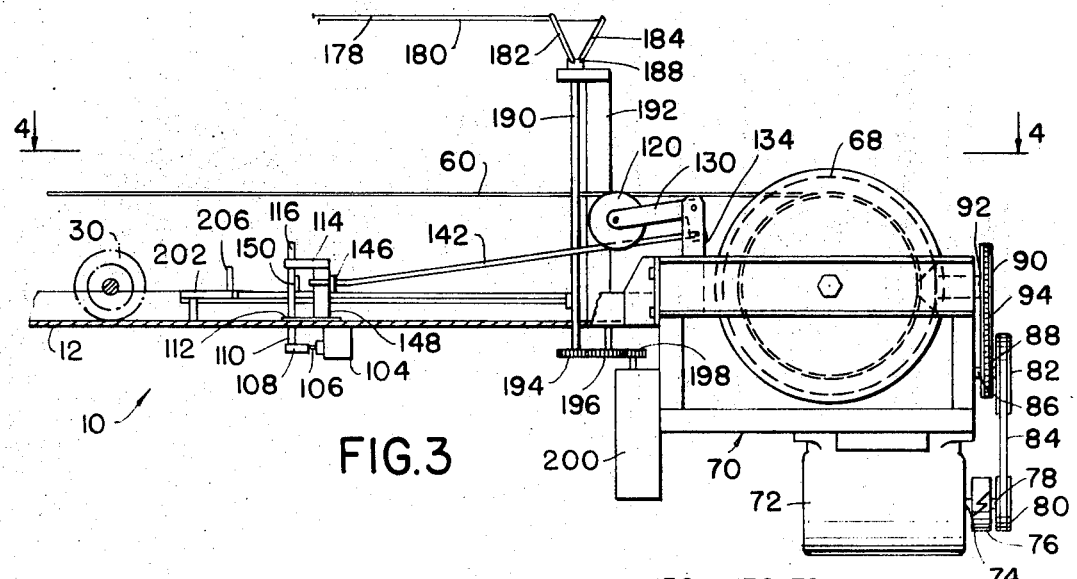
FIG. 3 is an elevational view of the structure at the right end of FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The cable-propelled vehicle-inclined track system 10 includes a pair of vertically spaced-apart upwardly inclined channel members 12, 14 which serve as tracks. The lower channel member 14 is supported on the ground by means of spaced-apart vertical columns 16. The upper channel member 12 is supported by posts 18 which extend from the channel member 14 to the channel member 12. The posts 18 are arranged at substantially right angles to the channel members 12, 14. The channel members are supported so as to be substantially parallel to the ground surface. There will, of course, be irregularities in the contour of the ground surface and the average incline of the ground surface is used as a guide. This will result in some of the columns 16 being shorter than others of the columns.

A pair of carriages 20, 22 are supported on the upper channel member 12. Each of the carriages has a pair of spaced-apart rollers 24, 26, 28, 30 which are in rolling engagement with the channel member 12. In FIG. 1, the main body of the carriage 22 is shown in phantom so as not to obscure the structure therebehind. Each of the carriages is adapted for the transport of one or more persons up or down the system. The carriages, which are driven by a single drive system, are so arranged as to meet in substantially the center of the channel member 12 so that one of the carriages will be at the top of the incline when the other is at the bottom and vice versa. It will be noted that the rollers 24, 26, 28, 30 are rotatably secured to a rack 21 which in turn is secured to the carriages 20, 22 at an angle so that the rollers are in vertically displaced positions with respect to each other, with the result that the carriages will always assume a substantially horizontal position. In this manner, the passengers do not ride at a tilted angle but are always able to stand upright. The angle of the rack 21 may be varied depending upon the incline of the hill.

The rack 21 includes side members 23, 25 and top member 27 and bottom member 29. The rollers are journaled in the upper ends of the side members. A directional bar 31 is supported on the top member 27 by means of a pair of brackets 33, 35.

As will be best noted in FIG. 2, the roller 28 is mounted on an axle 32 which is secured to an angled flange 34 of the side member 23 of the rack 21. The axle 32 has an angle of approximately 45° with respect to the web 38 of the channel member 12. The roller 28 contacts the radius corner portion 40 of the channel member 12. The radius of the roller is adapted to match the radius of the channel. Forces exerted by the roller are thus against both the web 38 and the flange 42 of the channel member. This distribution of forces and the angle of the roller result firm support of the carriage and the corner 40 acts as a guide to maintain the roller in a straight path as it rolls along the channel. The other rollers 24, 26, 30 are arranged in substantially the same fashion. The rollers 24, 26 engage the opposite corner 44 of the channel member. The diameter of the rollers is such that there is no interference of the rollers when the two carriages pass each other.

Figure 4:
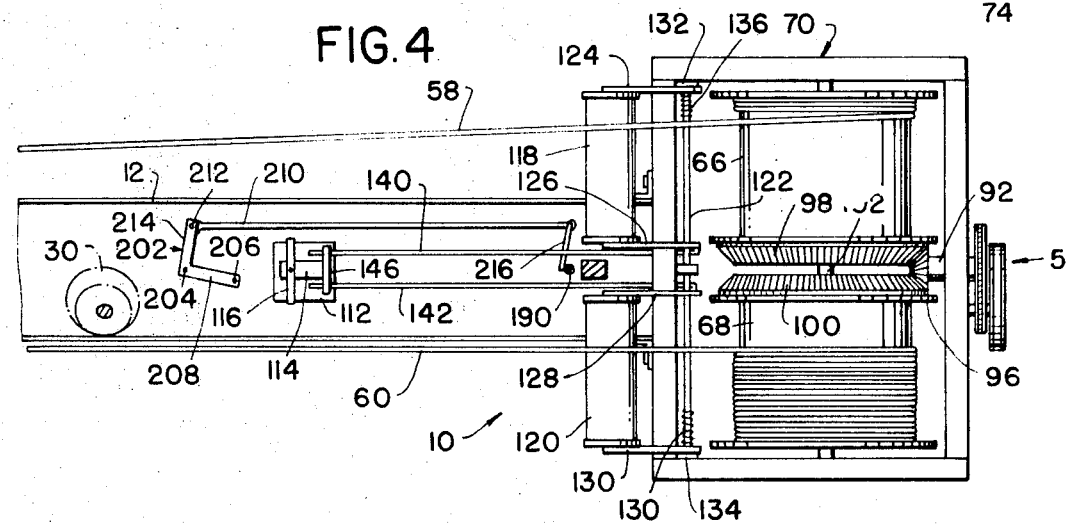
FIG. 4 is a sectional view taken substantially along the line 4-4 of FIG. 3 looking in the direction of the arrows.
Figure 5:
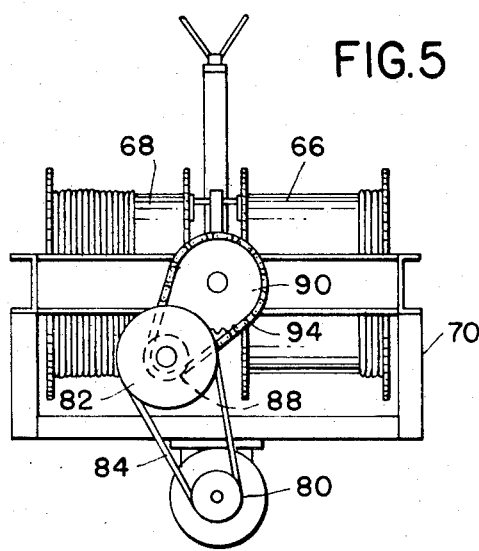
FIG. 5 is an elevational view of the end of the structure of FIG. 4 looking in the direction of the arrow.

A second set of spaced-apart rollers 46, 48, 50, 52 are provided on the bottom member 29 of the rack 21. These rollers ride against the flanges 54, 56 of the lower channel member 14. The angle of the upper rollers 24, 26, 28, 30 is such that the carriages will tend to swing into the flanges 54, 56 whereupon the rollers 46, 48, 50, 52 will make firm rolling contact. This arrangement prevents swinging of the carriages as they are moved up and down the track system.

a cable 58, 60 extends from the brake structure 62, 64 of each carriage 20, 22 and is wound around a drum 66, 68 provided at the upper end of the system 10. The drive system for the drums is best seen in FIGS. 3, 4 and 5. A support frame 70 is provided at the upper end of the channel members 12, 14. An electric motor 72 is suspended from the lower surface of the frame 70. The output shaft 74 of the motor 72 is connected to a clutch 76 which may be engaged or disengaged to the output shaft 74. The output shaft 78 of the clutch 76 carries a pulley 80. The clutch and pulley may be combined in an automatic clutch-pulley arrangement. A larger diameter pulley 82 is rotatably mounted on the frame 70 above the pulley 80. A belt 84 interconnects the pulleys. It will be noted that the pulley 80 is of less diameter than the pulley 82, thus resulting in a speed reduction.

The shaft 86 which carries the pulley 82 also carries a sprocket 88. A shaft 92 is provided above the sprocket 88 and a second sprocket 90 is mounted thereon. The sprockets 88, 90 are interconnected by a chain 94. Again, it will be noted that the diameter of the sprocket 88 is less than the diameter of the sprocket 90, thus resulting in a second stage of speed reduction.

The shaft 92 carries, at its inner end, a beveled pinion gear 96. The pinion gear 96 engages beveled drive gears 98, 100 which are provided at the adjacent ends of the drums 66, 68. The drums 66, 68 are mounted on a single axle 102 which extends across the frame 70. Again, it will be noted that the gears 98, 100 are substantially larger in diameter than the gear 96, thus resulting in a third stage of speed reduction.

In operation of the drive system, when the motor 72 is energized, it will drive the drums 66, 68 through the drive system above-described. The drums 66, 68 will be driven in opposite directions as a result of the arrangement of the gears 96, 98, 100. Consequently, when the drum 66 is rotated in a direction to reel in the cable 58, the drum 68 will be driven in a direction to unreel the cable 60. As a consequence, the carriage 20 will be pulled up the incline and the carriage 22 will be lowered down the incline.

A switching structure is provided to automatically deenergize the motor 72 when one or the other of the carriages 20, 22 arrives at the upper end of the channel member 12. As will be noted in FIGS. 3 and 4, a switch 104 is provided on the channel 12 adjacent to the upper end of the system. The switch 104 has a spring-urged plunger 106 which is biased outwardly therefrom to normally open the switch. A cam 108 is fixedly connected to the lower end of a shaft 110. The shaft 110 is mounted eccentrically with respect to the center of the cam 108. When the shaft 110 is rotated in either direction away from the center position shown in FIG. 3, the cam surface moves away from the outer end of the plunger 106, permitting the plunger to be urged outwardly to open the switch 104. The switch 104 is provided in the power circuit for the motor 72. Opening of the switch 104 is effective to deenergize the motor.

The shaft 110 extends upwardly and is journaled in a support plate 112. A forwardly extending bar 114 is carried on the upper end of the shaft 110. A cross bar 116 is provided on the upper end of the shaft 110 above the bar 114 and extends at substantially right angles to the bar 114. Portions of the bar 116 extend on either side of the bar 114.

In operation, when a roller, such as the roller 30 illustrated in phantom in FIGS. 3 and 4, approaches the upper end of the system, it will contract the bar 116 and cause the shaft 110 to pivot, thus turning the cam 108 and opening the power line to the motor 72. This will turn the motor off. The motor is preferably provided with a magnetic brake which, when the motor is deenergized, will be actuated to lock the entire system in place. The motor 72 may also be deenergized by manual control means as will be later described.

Means are also provided to automatically actuate the switch 104 in the event one of the cables 58, 60 slackens. Slackening of the cable may be caused by a break in the cable or by tangling of the cable on a portion of the support structure. As will be noted in FIGS. 3 and 4, a pair of rollers 118, 120 are rotatably mounted between pairs of support arms 124, 126, 128, 130. The support arms are in turn rotatably mounted on an axle 122 which extends between brackets 132, 134 secured to the frame 70. Torsion coil springs 136, 138 are provided on the axle 122. One end of each of the torsion springs 136, 138 engages an arm 124, 130. The other end of each spring engages the axle 122. The springs 136, 138 constantly bias the rollers 118, 120 upwardly in contact with the respective cables 58, 60.

The arms which mount the rollers 118, 120 are L-shaped. A push rod 140, 142 extends from the downwardly extending portion of each arm as illustrated in FIG. 3. The other ends of the push rods are slidingly received in openings in a bracket 146 which is mounted on a post 148, the post 148 being supported on the plate 112. A cross bar 150 provided on the shaft 110 beneath the bar 114 with projecting portions in alignment with the ends of the rods 140, 142.

In operation, if slack develops in one of the cables 58, 60, the springs 136, 138 bias the respective roller arms upwardly, thus pivoting the downward portion of the arms outwardly to drive the respective push rod 140, 142 into engagement with the crossbar 150. The pressure of the rod will cause the shaft 110 to pivot thus pivoting the cam 108. As previously described, pivoting of the cam 108 will result in deenergizing the motor 72. As a consequence, if for any reason one of the cables 58, 60 becomes slack, the motor 72 will automatically be deenergized resulting in discontinuance of the drive applied to the cables 58, 60.

Slackening of the cables 58, 60 will also result in application of one of the brakes 62, 64. The brake 64 is illustrated in FIGS. 6 and 7 and will be described in detail. However, it is to be understood that the brake 62 operates in substantially the same manner.

The brake 64 includes a first arm 152 which is pivotally attached at 154 to an upright support 25 of the rack 21. A brake arm 158 extends across the arm 152 and is fixedly secured thereto as by welding. The arm 158 extends upwardly to a point beyond the track member 12. A third brake arm 160 is pivotally attached at its lower end to the upper end of the arm 158. The arm 160 has a downwardly extending stop member 162 which abuts against the upper edge of the arm 158 when the arm 160 is pivoted in a clockwise manner in FIG. 6. In this condition, the arms 158, 160 are in alignment with the arm 160 being unable to be pivoted further to the right. This carries the lower portion of the arm 158 towards the support 25. An adjusting nut and bolt mechanism 164 is provided on the lower end of the arm 158. The adjustment mechanism may be threaded in or out to adjust the angular position of the arm 158 and arm 160 with the brake in the off or disengage condition.

The cable 60 is attached to the arm 160 by means of a bracket 166. There is normally tension applied to the arm 160 by the cable 60 by virtue of the force of gravity which tends to move the carriage 22 down the incline. It will be appreciated that the various members thus described in connection with the brake are of a relatively rugged nature to withstand the forces which are applied thereto.

The lower end of the arm 160 is formed with a curved cam-like enlarged portion 168. The edges of the portion 169 168 are provided with teeth 170. A similar toothed shoelike element 172 is provided on the outer end of the arm 152. With tension applied to the cable 60, the various parts are pivoted so that the portion 168 and shoe 172 are out of engagement with the channel member 12. A spring 174 extends from the arm 160 to a bracket 176. The spring 174 normally urges the arm 160 to pivot in the counterclockwise direction as viewed in FIG. 6.

In the event of slack developing in the cable 60, the spring 174 will cause the arm 160 to pivot counterclockwise with the result that the portion 168 will engage the channel member 12 and lock the carriage 22 against further movement. Pivoting of the arm 160 also results in pivoting of the arm structure 152, 158 with result that the shoe 172 will make braking contact with the underside of the channel member 12. This brake structure thus acts as an emergency brake to prevent unrestrained movement of the carriages down the incline in the event of a brake in the cable of a considerable slack developed in the cable as a result of tangling of the cable. The brake may also be manually actuated by grasping the upper end of the arm 160.

Starting, stopping and direction of motion of the carriages 20, 22 may be controlled by a passenger in either of the carriage. The means for accomplishing this, best seen in FIGS. 1 and 3, include a pair of control cables 178, 180 which are located above the channel member 12 within reach of a passenger in either of the carriages. The upper end of Reversal cable is connected to a angularly upwardly extending lever 182, 184. The cables extend down the incline parallel to the channels 12, 14 and are wound around a pulley 186 provided at the lower end of the structure.

The levers 182, 184 which form a fork structure, are secured to the upper end 188 of a pivotable control rod 190. The rod 190 is supported in position by a mast structure 192. The rod 190 extends downwardly and terminates at a point beneath the channel member 12. A gear 194 is provided on the lower end of the rod 190. The gear 194 meshes with an idler gear 196 which in turn meshes with a gear 198 provided on a control box 200. The control box 200 encloses a switch which is operative to start, stop and reverse direction of the motor 72 as will be later described. Pulling of one of the control cables 178, 180 in one direction will cause the motor to start and run in one direction, pulling of the other cable will cause the motor to start and run in the other direction, and pulling either of the cables to center position will cause the motor to be deenergized.

Means are provided at the upper end of the channel member 12 to automatically deenergize the motor 72 when one of the carriages 20, 22 reaches the top of the system. As will be noted in FIGS. 3 and 4, an L-shaped member 202 is pivotally mounted at 204 to the channel member 12. An upstanding pin 206 is carried at the outer end of the arm 208. One end of a rod 210 is pivotally attached at 212 to the outer end of the other arm 214. The rod 210 extends towards the control rod 190 and terminates at a point adjacent thereto. A link 216 is pivotally attached to the end of the rod 210. The link 216 extends to the control rod 190 and is fixedly secured thereto as by welding.

In operation of the carriage stopping structure, when one of the carriages approaches the upper end of the track, the forward roller thereof, such as the roller 30 illustrated in phantom, will contact the pin 206 causing pivoting of the L-shaped member 202 to draw the rod 210 in a direction downwardly of the channel member 12. The movement of the rod 210 will cause the link 216 to pivot. The control rod 190 will pivot therewith to a position where the switch which it actuates will cause the motor to be deenergized, thus stopping movement of the carriages. When the other carriage is moved to the top, the pin 206 is pivoted to a position where it will engage the forward roller thereof. This pivoting is cause by the position of the control rod 190 which is set to reverse direction of the motor.

Referring now to FIG. 8, operation of the electrical control system will be described. The motor 72 is a single-phase reversible electric motor. Leads 218, 220 are connected to the running winding of the motor. Leads 222, 224 are connected to the starting winding of the motor, and leads 226, 228 are connected to the conventional centrifugal switch provided in the motor. In operation of the motor, the starting windings are first energized to cause the armature to begin rotation. The running winding then continues to cause rotation of the armature. After the armature has reached a desired state, the centrifugal switch opens cutting out the starting winding, the motor continuing to operate as a result of energization of the running winding. Reversal of rotation of the motor is caused by changing the input polarity to the running windings.

Power to drive the motor 72 is provided by a single phase AC source 230. Leaks 232, 234 extend from the source 230 to a fused main switch 236. The switch 236 may be opened or closed manually to control the application of power to the circuit. This switch contains fuse structure which will open the circuit under overload conditions. Leads 238, 240 extends from the switch 236. The switch 104 is provided in the lead 238. As previously described, the switch 104 is normally maintained in the closed position by the cam 108. The cam 108 may be rotated out of contact with the plunger 106 as the result of a slack developing in the cables 58, 60 or when one of the carriages reaches the top of the incline and is not stopped in the ordinary automatic manner. As will be appreciated, opening of the switch 104 will result in deenergizing the electric circuit.

The leads 238, 240 extend to a switch 242. The switch 242 is connected to the control rod 190 via the gears 194, 196, 198. Each of the leads 238, 240 terminate in contacts 244, 246 which may engage rotatable contacts 248, 250 provided on shaft 252. The shaft 252 is connected to the gear 198 and rotates therewith. It will be noted that each of the contacts 248, 250 has one long arm 254, 256 and one short arm 258, 260. A third contact 262 is provided between the contacts 248, 250.

A lead 264 extends therefrom to one contact of a solenoid operated switch 266 which has three sets of contact. The other contact of the first set of contacts is connected to the lead 218 and thus to one side of the running winding of the motor. One contact of the next set of contacts of the switch 266 is connected to a contact 268 of the switch 242 via the lead 270. The other contact of this set of contacts is connected to the lead 220 and thus to the other side of the start winding of the motor. One contact of the third set of contacts of the switch 266 is connected to a contact of a second solenoid operated switch 272 which has two sets of contacts. The other contact of the final set of contacts of the switch 262 is connected to one side of the solenoid coil 274 by a lead 276.

A lead 278 is also connected to the same side of the coil 274. The lead 278 extends to the other contact of the first set of contacts of the second switch 272. The other side of the coil 274 is connected to a contact 280 of the switch 242 via a lead 282. A lead 284 extends from the same side of the coil 274 and is connected to one side of the coil 286 of the second switch 272. The starting-winding lead 224 is also connected to this side of the coil 286. The centrifugal switch lead 226 is connected to the other side of the coil 286. The other centrifugal switch lead 228 is connected to the first contact of the second set of contacts of the switch 272. The other contact of this set is connected to the starting-winding lead 222.

In operation of the circuit thus described, three different operating conditions may be obtained by manipulation of the switch 242. One condition is the deenergization of the entire circuit which may be achieved by moving the switch to a central position wherein the switch arms 254, 256, 258, 260 do not contact any of the switch contacts. In this condition, the motor is deenergized. This occurs either by manipulation of the control cables 178, 180 by a passenger in one of the carriages 20, 22 or by one of the carriage rollers contacting the pin 206 of the stopping mechanism when the carriage reaches the top of the incline.

The second condition is when the switch 242 is in the position illustrated in FIG. 8. In this position, the motor 72 is energized to rotate in one direction. The circuit for energizing the motor 72 may be traced via the hot lead 238 and ground lead 240 extending from the source of power to the contacts 244, 246. These contacts make electrical contact with the short arm 258 and long arm 256 of the rotatable contacts of switch 242. Lead 282 extends from contact 280 which is in electrical engagement with the long arm 254. Lead 282 extends to one side of the coil 286. Lead 228 extends from the other side of the coil 286 to the centrifugal switch. Lead 228 extends from the other side of the switch to one contact of the second set of contacts of switch 272. Lead 288 extends from this contact to the first contact of the first set of contacts of the switch 272. Lead 290 extends therefrom to contact 292 which is in electrical engagement with the short arm 260. Thus, a circuit is completed through the coil 286 causing the coil to be energized and closing the switch 272.

Closure of the switch 272 results in energization of the starting winding of the motor. One lead 224 of the starting winding is connected to the lead 284 at one side of the coil 286. The other lead 222 of the starting winding is connected to ground via the switch 272, lead 288, lead 290 and contact 292 of switch 242.

Closure of switch 272 results in closure of switch 266 to energize the running winding of the motor 72. The circuit to the coil 274 comprises lead 282, coil 274, lead 278, switch 272, lead 290 and thence to contact 292.

Closure of switch 266 results in energizing the starting winding of the motor 72. This circuit may be traced from contact 268 of switch 242, lead 270, switch 266 and thence lead 220 to one side of the running winding. Lead 218 extends from the other side of the running winding to closed switch 266 and thence via lead 264 to contact 262 to complete the circuit through the source of power.

The switch 242 may be reversed to apply power of opposite polarity to the motor windings. When the switch 242 is reversed, the long arm 254 will electrically engage contacts 244, 262 and the short arm 258 will engage the contact 280. The long arm 256 will engage the contacts 268, 292 while the short arm 260 will engage the contact 246. With this arrangement, the switches 272, 266 will close in the manner substantially similar to that previously described. Considering these switches closed, the circuit may be traced illustrating that the winding lead 218 will be connected to the power lead 238 and the lead 220 will be connected to the power lead 240 which is the reverse of the connections previously described. The circuit may be traced via lead 218, switch 266, contact 262, arm 254, contact 244 and lead 238. From the other side of the running winding, the circuit may be traced via lead 220, switch 266, lead 270, contact 268, arm 256, contact 292, arm 260, contact 246 and lead 240.

I claim:

1. A lift comprising an inclined track, a pair of carriages movable on said track, power means for moving the carriages up and down the inclined track, one of said carriages being positioned at one end of said track when the other of said carriages is positioned at the other end of said track, power transmission means connected between the carriages and the power means, brake means on the carriages to selectively lock the carriages to the track, brake actuating means operable to cause application of the brake means upon failure of the power means or power transmission means, means to signal the brake actuating means upon such failure, control line means accessible to passengers in the carriages running substantially the length of the track, control switch means adjacent one end of the track operable to start, stop and reverse the direction of drive of the power means said control line means being connected to the control switch means and operable to selectively actuate said control switch means upon being manipulated by a passenger in one of the carriages, switch actuating means carried by each carriage and operable to contact and actuate said control switch means to deenergize the power means when one of the carriages reaches the end of the track at which the control switch means is located, said control switch means including a control switch, a pivotal member positioned a adjacent to one end of the track, contact means on the pivot member movable to one side or the other of the track depending upon the direction of drive of the power means to be in alignment with the switch actuating means on the approaching carriage, and a linkage connecting said pivotal member with said control switch engagement of said contact means with the switch actuating means on one of the carriages resulting in pivoting of the pivotal member and movement of the linkage to actuate the control switch to deenergize the power means.

2. A lift as defined in claim 1 and further characterized in the provision of safety switch means including a safety switch and switch operating means positioned between said aforementioned control switch means and the adjacent end of the track, and means on the carriages to contact said safety switch operating means to open the safety switch and deenergize the power means in the event the carriage passes beyond the control switch means without deenergizing the power means.

3. A lift as defined in claim 1 and further characterized in that said power transmission means comprises a pair of cables connected between the power means and the carriages, contact elements in engagement with the cables, means biasing the contact elements towards the cables, a safety switch, means connecting the contact elements with the safety switch and operable to actuate the safety switch to open and deenergize the power means upon movement of one of the contact elements upon slackening of the corresponding cable to result in deenergization of the power means.

4. A lift as defined in claim 3 and further characterized in that each of said contact elements comprises a roller, arm structure having the roller journaled at one end thereof, bracket means pivotally mounting the arm structure at the other end thereof, spring means biasing the arm structure in a direction to move the roller into engagement with the corresponding cable, and means connecting the arm structure with the safety switch to actuate the safety switch upon movement of the roller after slackening of the corresponding cable.

5. A lift as defined in claim 2, and further characterized in that said power means comprises a reversible electric motor, an electric circuit connecting said motor to a source of power, said control switch means comprising a three-position switch and operative in said circuit in one position to deenergize the motor, in a second position to apply current of one polarity to the motor, and in the third position to apply current of the opposite polarity to the motor, said safety switch being a two-position switch between the motor and the power source and operable in one position to close the circuit to the power source and in the other position to open the circuit to the power source.

6. A lift comprising an inclined track, a movable carriage on said track, power means for moving the carriage up and down the inclined track, power transmission means connected between the carriage and the power means, brake means on the carriage to selectively lock the carriage to the track, brake actuating means operable to cause application of the brake means upon failure of the power means or power transmission means, control line means accessible to a passenger in the carriage running substantially the length of the track, control switch means adjacent one end of the track operable to start, stop and reverse the direction of drive of the power means, said control line means being connected to the control switch means and operable to selectively actuate said control switch means upon being manipulated by a passenger in the carriage, switch actuating means carried by the carriage and operable to contact and actuate said control switch means to deenergize the power means when the carriage reaches the end of the track at which the control switch means is located, said control switch means including a control switch a pivotal member positioned adjacent to one end of the track, contact means on the pivot member movable to one side or the other of the track depending upon the direction of drive of the power means to be in alignment with the switch actuating means on the approaching carriage, and a linkage connecting said pivotal member with said control switch, engagement of said contact means with the switch actuating means on the carriage resulting in pivoting of the pivotal member and movement of the linkage to actuate the control switch to deenergize the power means.

7. A lift as defined in claim 6 and further characterized in that said inclined track comprises a channellike member having a pair of angularly related walls, said carriage having a plurality of rollers received in said track, said rollers being oriented with respect to the track to be received in rolling engagement at the juncture of said angularly related walls at an angle intermediate the angle formed by said walls.

8. A lift as defined in claim 7 and further characterized in that said rollers are journaled on a rack, said rack being fastener to the carriage at an angle resulting in the carriage assuming a substantially upright position.

9. A lift as defined in claim 6 and further characterized in that said power transmission means comprises a cable connected between the power means and said brake means, said brake actuating means comprising spring means biasing the brake means to cause application thereof upon slackening or breaking of the cable to result in application of the brake means.

10. A lift as defined in claim 6 and further characterized in the provision of safety switch means including a safety switch and switch operating means positioned between the control switch means and the adjacent end of the track, and means on the carriages to contact said safety switch operating means to open the safety switch and deenergize the power means in the event the carriage passes beyond the control switch means without deenergizing the power means.

11. A lift comprising an inclined elongated track including an elongated upwardly facing channellike member having a web and a pair of upwardly extending flanges angularly connected to opposite longitudinal edges of said web, a pair of carriages carried by said track and movable along opposite sides thereof, each carriage having a rack which is fastened to such carriage at an angle resulting in the carriage assuming a substantially upright position, a plurality of rollers journaled on each rack and received in said channellike member in rolling engagement therewith at the juncture of said web and one of said flanges, the rollers on one carriage rack being in rolling engagement with a different flange than the other carriage rack to permit the carriages to move along the tack on opposite sides thereof without obstruction from the other carriage, one of said carriages being positioned at the one end of said track when the other of said carriages is positioned at the other end of said track, power transmission means connected between the carriages and the power means, brake means on the carriages to selectively lock the carriages to the track, brake actuating means operable to cause application of the brake means upon failure of the power means or power transmission means, means to signal the brake actuating means upon such failure, control line means accessible to passengers in the carriages running substantially the length of the track, control switch means adjacent one end of the track operable to start, stop and reverse the direction of drive of the power means, said control line means being connected to the control switch means and operable to selectively actuate said control switch means upon being manipulated by a passenger in one of the carriages, switch actuating means carried by each carriage and operable to contact and actuate said control switch means to deenergize the power means when such carriage reaches the end of the track at which the control switch means is located, safety switch means including a safety switch and switch operating means positioned between the control switch means and the adjacent end of the track, and means on the carriages to contact said safety switch operating means to open the safety switch and deenergize the power means in the event the carriage passes beyond the control switch means without deenergizing the power means.

12. A lift as defined in claim 11 and further characterized in that said power transmission means comprises a pair of cables connected between the power means and the carriages, contact elements in engagement with the cables, means biasing the contact elements toward the cables, a safety switch, means connecting the contact elements with the safety switch and operable to actuate the safety switch to deenergize the power means upon movement of one of the contact elements upon slackening of the corresponding cable to result in deenergization of the power means.

13. A lift as defined in claim 11 and further characterized in that said power means comprises a reversible electric motor, an electric circuit connecting said motor to a source of power, said control switch means comprising a three-position switch and operative in said circuit in one position to deenergize the motor, in a second position to apply current of one polarity to the motor, and in the third position to apply current of the opposite polarity to the motor, said safety switch being a two-position switch between the motor and the power source and operable in one position to close the circuit to the power source and in the other position to open the circuit to the power source.

14. A lift as defined in claim 11 and further characterized in that said control switch means includes a control switch, a pivotal member positioned adjacent to one end of the track, contact means on the pivot member movable to one side or the other of the track depending upon the direction of drive of the power means to be in alignment with the switch actuating means on the approaching carriage, linkage connecting said pivotal member with said control switch, contact of said contact means with the switch actuating means on one of the carriages resulting in pivoting of the pivotal member and movement of the linkage to actuate the control switch to deenergize the power means.